United States Patent
Murrow et al.

(10) Patent No.: US 12,503,219 B2
(45) Date of Patent: Dec. 23, 2025

(54) AERONAUTICAL PROPULSION SYSTEM HAVING ELECTRIC FANS

(71) Applicant: General Electric Company, Schenectady, NY (US)

(72) Inventors: Kurt David Murrow, Springboro, OH (US); Darek Tomasz Zatorski, Fort Wright, KY (US); Matthew Timothy Franer, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/515,830

(22) Filed: Nov. 21, 2023

(65) Prior Publication Data

US 2025/0019071 A1    Jan. 16, 2025

Related U.S. Application Data

(60) Provisional application No. 63/427,491, filed on Nov. 23, 2022.

(51) Int. Cl.
| | |
|---|---|
| *B64C 11/46* | (2006.01) |
| *B64C 11/00* | (2006.01) |
| *B64C 29/00* | (2006.01) |

(52) U.S. Cl.
CPC ............ *B64C 11/46* (2013.01); *B64C 11/001* (2013.01); *B64C 29/0025* (2013.01)

(58) Field of Classification Search
CPC ..... B64C 29/0025; B64C 3/22; B64C 11/001; B64C 11/46; B64C 29/0033; B64D 27/31
See application file for complete search history.

(56) References Cited

U.S. PATENT DOCUMENTS

| | | | |
|---|---|---|---|
| 2,973,166 A | * | 2/1961 | Stahmer .............. B64C 29/0025 D12/330 |
| 3,030,051 A | | 4/1962 | Kerry et al. |
| 3,056,565 A | | 10/1962 | Griffith |
| 3,082,977 A | * | 3/1963 | Arlin .................. B64C 29/0025 244/92 |
| 3,088,694 A | | 5/1963 | Stirgwolt et al. |
| 3,310,260 A | | 3/1967 | Chichester-Miles |
| 3,448,945 A | | 6/1969 | Ascani, Jr. |
| 8,636,241 B2 | | 1/2014 | Lugg et al. |
| 9,889,928 B2 | | 2/2018 | Salz |
| 10,364,024 B2 | | 7/2019 | Tighe et al. |

(Continued)

FOREIGN PATENT DOCUMENTS

CN        206954506 U    2/2018

*Primary Examiner* — William L Gmoser
(74) *Attorney, Agent, or Firm* — Dority & Manning, P.A.

(57) ABSTRACT

An aircraft defining a vertical direction, a longitudinal direction, and a transverse direction is provided. The aircraft includes: a fuselage; a propulsion system comprising a power source and a plurality of vertical thrust electric fans driven by the power source; and a wing extending from the fuselage in the transverse direction. The wing includes a support structure that comprises a plurality of first support members and a plurality of second support members. The plurality of first support members extending at least partially between the plurality of second support members. The plurality of vertical thrust electric fans arranged between the plurality of first support members and the plurality of second support members.

18 Claims, 9 Drawing Sheets

(56) References Cited

U.S. PATENT DOCUMENTS

| | | | |
|---|---|---|---|
| 10,427,784 B2* | 10/2019 | Parks | B64D 27/33 |
| 10,822,101 B2 | 11/2020 | Murrow et al. | |
| 11,001,377 B1* | 5/2021 | Robinson | B64C 29/00 |
| 11,358,712 B2 | 6/2022 | Tighe et al. | |
| 11,597,509 B1* | 3/2023 | Alfaro | B64C 29/0025 |
| 12,179,928 B2* | 12/2024 | Hoffmeister | B64D 27/24 |
| 2016/0311529 A1* | 10/2016 | Brotherton-Ratcliffe | G08G 5/32 |
| 2018/0201369 A1* | 7/2018 | Johnson | B64C 11/001 |
| 2019/0023389 A1* | 1/2019 | Murrow | B64D 27/33 |
| 2020/0247536 A1* | 8/2020 | Mokhtarian | B64U 50/31 |
| 2020/0331589 A1* | 10/2020 | Cummings | B64D 27/14 |
| 2021/0300540 A1* | 9/2021 | Robertson | B64C 1/0009 |
| 2022/0033072 A1* | 2/2022 | Bender | B64C 3/32 |
| 2022/0081108 A1 | 3/2022 | Mikic et al. | |
| 2022/0185468 A1* | 6/2022 | Bernard | G10K 11/172 |
| 2022/0194575 A1* | 6/2022 | Duffy | F02K 1/002 |
| 2022/0297827 A1 | 9/2022 | Colaciti et al. | |
| 2023/0257132 A1* | 8/2023 | Morisaki | H02K 1/20 244/57 |

\* cited by examiner

12,503,219 B2

AERONAUTICAL PROPULSION SYSTEM HAVING ELECTRIC FANS

PRIORITY INFORMATION

The present application is a claims benefit of priority under 35 U.S.C. § 119 (e) to U.S. Provisional Application No. 63/427,491, filed Nov. 23, 2022, which is hereby incorporated by reference in its entirety for all purposes.

FIELD

The present disclosure relates to an aeronautical propulsion system having electric fans.

BACKGROUND

Aircraft have been developed with a capability for performing vertical takeoff and landings. Such a capability may allow for the aircraft to reach relatively rugged terrains and remote locations, where it may be impractical or infeasible to construct a runway large enough to allow for a traditional aircraft (lacking vertical takeoff capability) to takeoff or land.

Typically these aircraft that are capable of performing vertical takeoff and landings have engines and propulsors that are vectored to generate both vertical thrust and forward thrust. These propulsors may be relatively large to generate an amount of thrust required for vertical takeoff and landings, as well as for forward flight. However, such a configuration may create complications, as the propulsors are generally designed to be most efficient during one of vertical thrust operations or forward thrust operations. Such may therefore lead to inefficiencies within the aircraft. Accordingly, a vertical takeoff and landing aircraft designed to address these inefficiencies would be useful.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
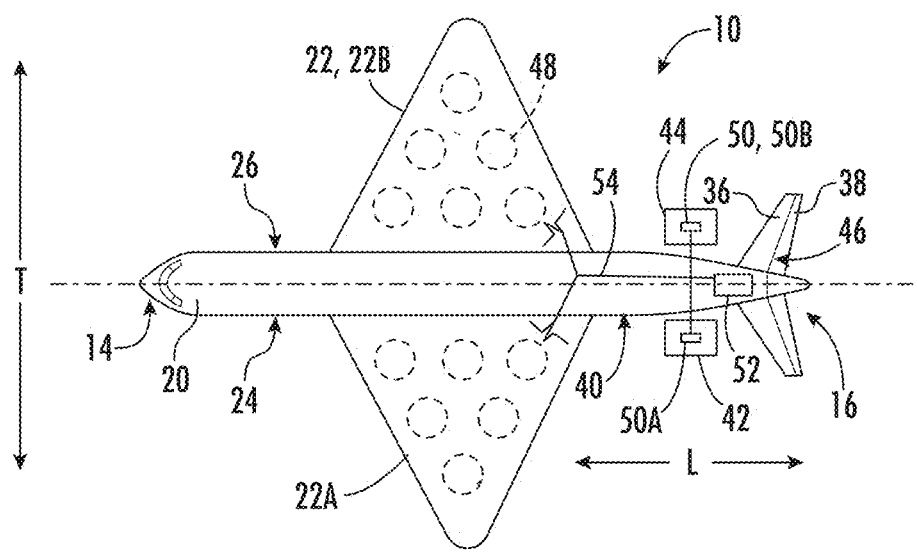
FIG. 1 is a top view of an aircraft in accordance with an exemplary embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

The term "straight support members" refers to a support member that may define a straight reference line, when viewing the support member along a lengthwise direction, extending completely within a body of the support member.

It will be appreciated that as used herein, the term "parallel", as used to describe an orientation of a first element/aspect to an orientation of a second element/aspect, refers to an average reference line of the first element/aspect defining an angle with an average reference line of the second element/aspect less than 15°, such as less than 10°, such as less than 5°. The average reference line of an element/aspect (e.g., an edge) within a given plane refers to a line connecting the closest edge of the element/aspect at opposing ends of a middle 80% of the element/aspect.

The present disclosure is generally related to an aircraft having vertical thrust capabilities, such as an aircraft having vertical takeoff and vertical landing capabilities. The aircraft generally includes a fuselage, a wing extending from the fuselage in a transverse direction, and a propulsion system. The propulsion system includes a power source and a plurality of vertical thrust electric fans driven by the power source. The wing includes a support structure having a plurality of first support members and a plurality of second support members. The plurality of first support members extend at least partially between the plurality of second support members, and the plurality of vertical thrust electric fans are arranged between the plurality of first and second support members.

For example, the first support members may be transverse support members extending at least partially along a transverse direction of the aircraft and the second support members may be longitudinal support members extending at least partially along the longitudinal direction of the aircraft.

For example, the plurality of first and second support members may together define a plurality of gaps, and each vertical thrust electric fan of the plurality of vertical thrust electric fans may be positioned in a respective gap of the plurality of gaps.

For example, the wing may include a leading edge and a trailing edge, the plurality of second support members may include a leading edge second support member extending parallel to the leading edge of the wing, and the plurality of first support members may include a trailing edge first support member extending parallel to the trailing edge of the wing.

In such a manner, the plurality of vertical thrust electric fans may be integrated within the support structure of the wing, allowing for the wing support structure to be designed in a desired manner from a structural standpoint.

Figure 2:
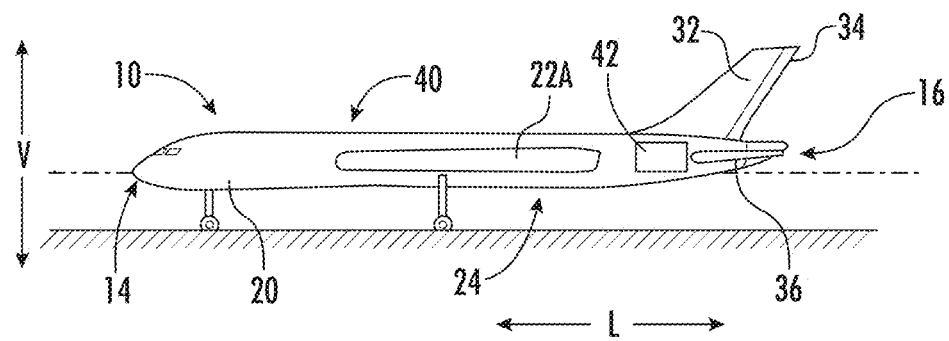
FIG. 2 is a side view of the exemplary aircraft of FIG. 1.

Referring now to the drawings, wherein identical numerals indicate the same elements throughout the Figs., FIG. 1 provides a top view of an exemplary aircraft 10 as may incorporate various embodiments of the present disclosure. FIG. 2 provides a port side 24 view of the aircraft 10 as illustrated in FIG. 1. As shown in FIGS. 1 and 2 collectively, the aircraft 10 defines a longitudinal direction L that extends therethrough, a vertical direction V, a transverse direction T, a forward end 14, and an aft end 16. The longitudinal direction L, vertical direction V, and transverse direction T may collectively form an orthogonal coordinate system.

Moreover, the aircraft 10 includes a fuselage 20, extending longitudinally from the forward end 14 of the aircraft 10 towards the aft end 16 of the aircraft 10, and a pair of wings 22, or rather, a first wing 22A and a second wing 22B. The first wing 22A extends outwardly from the fuselage 20 generally along the transverse direction T with respect to the longitudinal direction L, from the port side 24 of the fuselage 20. Further, the second wing 22B similarly extends outwardly from the fuselage 20, generally along the transverse direction T with respect to the longitudinal direction L, from the starboard side 26 of the fuselage 20. Although not depicted, each of the wings 22A, 22B may include one or more leading edge flaps and one or more trailing edge flaps.

Referring still to the exemplary aircraft 10 of FIGS. 1 and 2, the aircraft 10 further includes a vertical stabilizer 32 having a rudder flap 34 for yaw control (see FIG. 2), and a pair of horizontal stabilizers 36, each having an elevator flap 38 for pitch control. The fuselage 20 additionally includes an outer surface 40. However, it should be appreciated that in other exemplary embodiments of the present disclosure, the aircraft 10 may additionally or alternatively include any other suitable configuration of stabilizers that may or may not extend directly along the vertical direction V or horizontal/transverse direction T. In addition, alternative stabilizers may be any suitable shape, size, configuration, or orientation while remaining within the scope of the present subject matter.

The exemplary aircraft 10 of FIGS. 1 and 2 also includes a propulsion system. The exemplary propulsion system depicted includes a plurality of aircraft engines, which in the embodiment depicted are shown coupled to the fuselage 20 proximate the aft end 16. Specifically, the plurality of aircraft engines includes a first aircraft engine 42 mounted to fuselage 20 on the port side 24, and a second aircraft engine 44 mounted to the fuselage 20 on the starboard side 26. In at least certain exemplary embodiments, the aircraft engines 42, 44 may be configured as turbofan jet engines.

Alternatively, however, in other exemplary embodiments any other suitable aircraft engine may be provided. For example, in other exemplary embodiments the first and/or second aircraft engines 42, 44 may alternatively be configured as turbojet engines, turboshaft engines, turboprop engines, etc. Further, in still other exemplary embodiments, the aircraft engines may be mounted at any other suitable location (e.g., under-wing, integrated with the wing and/or fuselage, etc.).

Moreover, it will be appreciated that the exemplary propulsion system depicted further includes a power source 46 and a plurality of vertical thrust electric fans 48 driven by the power source 46. In the embodiment shown, the power source 46 includes one or more electric machines 50 rotatable by the aircraft engines, and more specifically includes a first electric machine 50A rotatable by the first aircraft engine 42 and a second electric machine 50B rotatable by the second aircraft engine 44. The power source 46 further includes an electric energy storage unit 52, which may be configured as one or more batteries, and an electric communication bus 54 for electrically coupling the power source 46 to the plurality of vertical thrust electric fans 48.

Figure 3:
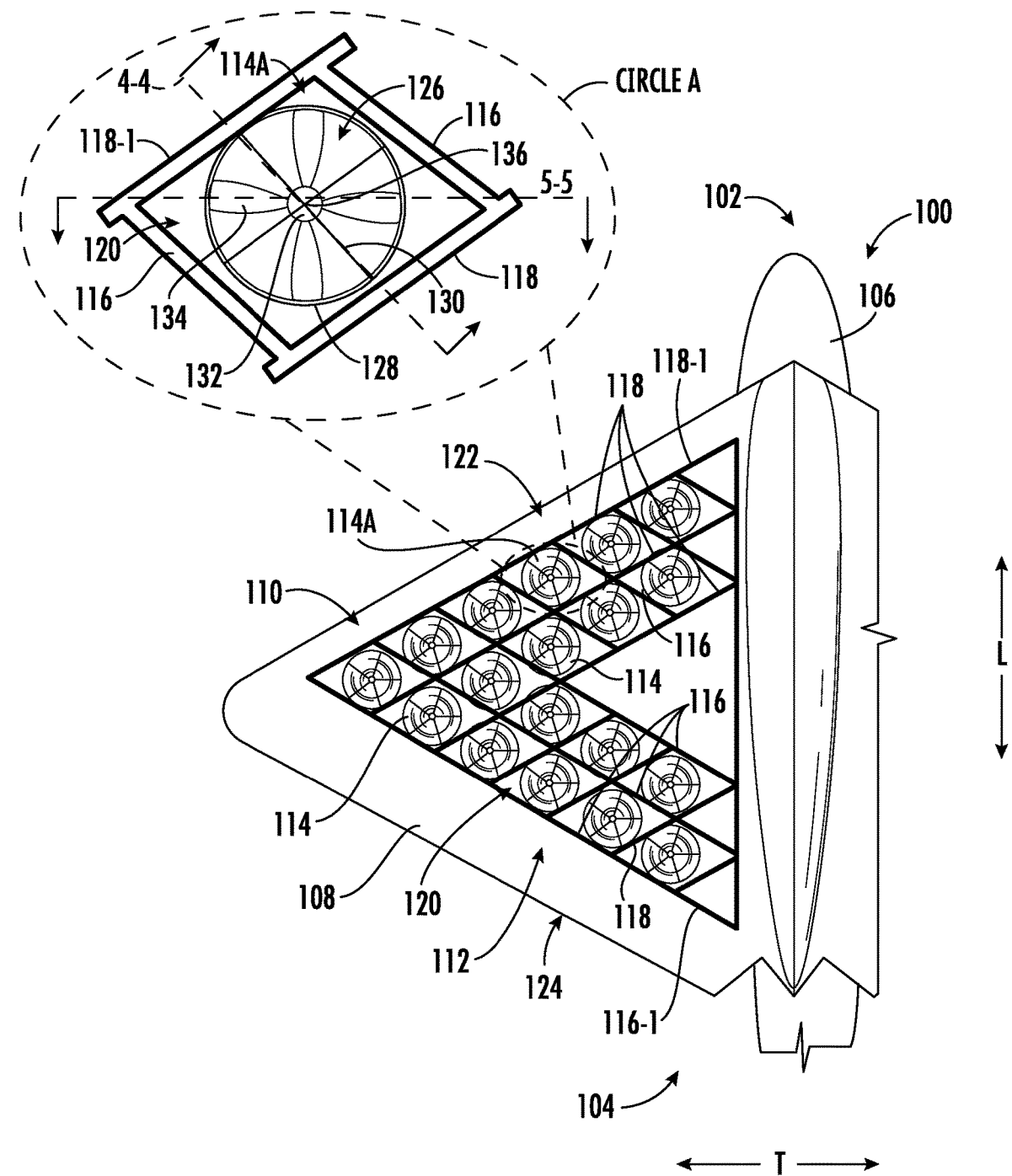
FIG. 3 is a close up, schematic view of a wing of the aircraft of FIGS. 1 and 2.

Referring now to FIG. 3, a close up, schematic view is depicted of an aircraft 100 in accordance with an exemplary embodiment of the present disclosure. In at least certain exemplary embodiments, the aircraft 100 of FIG. 3 may be configured in a similar manner as the exemplary aircraft 100 10 of FIGS. 1 and 2.

In such a manner, it will be appreciated that the aircraft 100 defines a longitudinal direction L that extends therethrough, a vertical direction V (see, e.g., FIG. 4), a transverse direction T, a forward end 102, and an aft end 104. Further, the aircraft 100 includes a fuselage 106, a wing 108 extending from the fuselage 106, and a propulsion system 110. The wing 108 has a support structure 112 for providing strength and rigidity for the wing 108. The exemplary propulsion system 110 includes a plurality of vertical thrust electric fans 114. As will be described in more detail below, the plurality of vertical thrust electric fans 114 are integrated into the support structure 112 of the wing 108.

More specifically, the support structure 112 of the wing 108 includes a plurality of first support members and a plurality of second support members. The plurality of second support members extend at least partially between the first support members.

More specifically, still, the plurality of first support members is a plurality of transverse support members 116 extending at least partially along the transverse direction T, and the plurality of second support members is a plurality of longitudinal support members 118 extending at least partially along the longitudinal direction L. The plurality of longitudinal support members 118 extend at least partially between the transverse support members 116.

In the embodiment shown, the plurality of transverse support members 116 are each parallel to one another in the reference plane depicted in FIG. 3 (e.g., a reference plane extending perpendicular to the vertical direction V) and the plurality of longitudinal support members 118 are similarly parallel to one another in the reference plane depicted in FIG. 3. In such manner, the plurality of longitudinal support members 118 and transverse support members 116 together form a grid of structural supports extending through the wing 108. The grid of structural supports defines a plurality of gaps 120, and more specifically for the embodiment depicted, the plurality of longitudinal support members 118 and the plurality of transverse support members 116 together define the plurality of gaps 120.

Notably, in the embodiment shown, the wing 108 includes a leading edge 122 and a trailing edge 124. The plurality of longitudinal support members 118 includes a leading edge longitudinal support member 118-1 and the plurality of transverse support members 116 includes a trailing edge transverse support member 116-1. In the embodiment shown, the leading edge longitudinal support member 118-1 extends parallel to the leading edge 122 of the wing 108 in the reference plane depicted in FIG. 3, and the trailing edge transverse support member 116-1 extends parallel to the trailing edge 124 of the wing 108 in the reference plane depicted in FIG. 3.

Further, it will be appreciated that for the embodiment depicted, the plurality of longitudinal support members 118, the plurality of transverse support members 116, or both include a plurality of straight support members. The terms "straight support members" and "parallel" have the meanings set forth above.

Referring still to FIG. 3, it will be appreciated that the plurality of vertical thrust electric fans 114 of the propulsion system 110 are arranged between the plurality of longitudinal support members 118 and the plurality of transverse support members 116. Specifically, for the embodiment depicted, each vertical thrust electric fan 114 of the plurality of vertical thrust electric fans 114 is positioned in a respective gap 120 of the plurality of gaps 120 defined by the plurality of longitudinal support members 118 and the plurality of transverse support members 116.

In such a manner, it will be appreciated that the plurality of vertical thrust electric fans 114 may be integrated into the support structure 112 for the wing 108, such that integration of the propulsion system 110 with the wing 108 may not substantially negatively affect a structural design of the wing 108.

Notably, in order to integrate into the support structure 112 of the wing 108, the plurality of vertical thrust electric fans 114 may be relatively small, and as such, the propulsion system 110 may include a large number of vertical thrust electric fans 114 to provide a necessary thrust to enable vertical takeoff and landing operations of the aircraft 100. For example, in the exemplary embodiment of FIG. 3, the plurality of vertical thrust electric fans 114 includes at least five vertical thrust electric fans 114, such as at least eight vertical thrust electric fans 114, such as at least 11 vertical thrust electric fans 114, such as at least 15 vertical thrust electric fans 114, such as up to 100 vertical thrust electric fans 114, such as up to 75 vertical thrust electric fans 114, such as up to 50 vertical thrust electric fans 114.

Inclusion of the plurality of vertical thrust electric fans 114 may allow for various desirable arrangements of the plurality of vertical thrust electric fans 114. For example, in the embodiment depicted, the plurality of vertical thrust electric fans 114 includes two or more vertical thrust electric fans 114 arranged generally along the longitudinal direction L (i.e., aligned along the longitudinal direction L). Moreover, for the embodiment depicted, the plurality of vertical thrust electric fans 114 additionally includes two or more vertical thrust electric fans 114 offset from one another relative to the longitudinal direction L. Such a configuration may be useful during transition from a vertical thrust operation to a forward thrust operation.

Referring to the callout Circle A in FIG. 3, a first vertical thrust electric fan 114A of the plurality of vertical thrust electric fans 114 incorporated into the wing 108 of FIG. 3 is shown in more detail. Each of the plurality of vertical thrust electric fans 114 of the plurality of vertical thrust electric fans 114 incorporated into the wing 108 of FIG. 3 may be configured in substantially the same manner as the exemplary first vertical thrust electric fan 114A described herein below.

The first vertical thrust electric fan 114A generally includes a rotor blade assembly 126, a shroud assembly 128 surrounding the rotor blade assembly 126, and one or more structural supports 130. The rotor blade assembly 126 includes a hub 132 and a plurality of rotor blades 134 coupled to the hub 132. The first vertical thrust electric fan 114A defines a rotational axis 136, and the rotor blade assembly 126 is rotatable about the rotational axis 136. The rotational axis 136 may be aligned with the vertical direction V.

The first vertical thrust electric fan 114A is arranged between a pair of longitudinal support members 118 and a pair of transverse support members 116.

Figure 4:
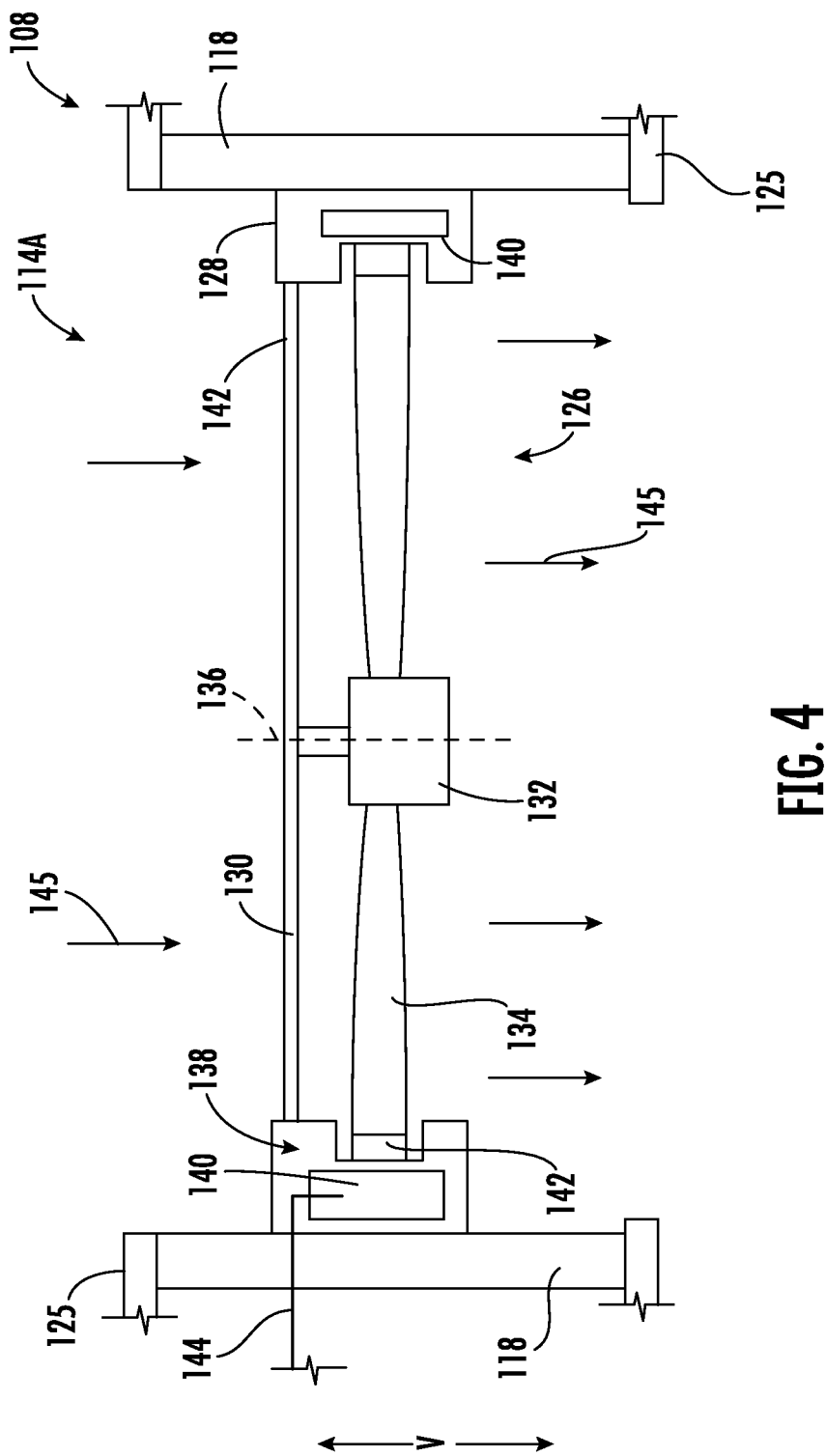
FIG. 4 is a schematic, cross-sectional view of a first vertical thrust electric fan of FIG. 3, as viewed along Line of 4-4 in FIG. 3.

Referring now also to FIG. 4, a schematic, cross-sectional view of the first vertical thrust electric fan 114A of FIG. 3 is provided, as viewed along Line of 4-4 in FIG. 3. As will be appreciated from the view of FIG. 4, the first vertical thrust electric fan 114A is coupled to and supported by the longitudinal support members 118, the transverse support members 116, or both. In particular, for the embodiment of FIG. 4, the first vertical thrust electric fan 114A is coupled to a pair of longitudinal support members 118. More specifically, the shroud assembly 128 of the first vertical thrust electric fan 114A is coupled to the pair of longitudinal support members 118.

Notably, in the embodiment depicted the one or more structural supports 130 extend between the shroud assembly 128 and the hub 132 of the rotor blade assembly 126 to couple the rotor blade assembly 126 to the shroud assembly 128. In such a manner, the plurality of longitudinal support members 118 may structurally support the first vertical thrust electric fan 114A. The one or more structural supports 130 may include one or more bars, beams, struts, or the like.

Briefly, as may also be seen in FIG. 4, the wing 108 additionally includes a surface layer or skin 125 on a top side of the wing 108 and on a bottom side of the wing 108. The surface layer 125 is coupled to the support structure 112 in the embodiment shown and may form an aerodynamic surface of the wing 108.

As will also be appreciated from the view of FIG. 4, the first vertical thrust electric fan 114A further includes an electric motor 138 to drive the rotor blade assembly 126. In the embodiment depicted, the electric motor 138 is more specifically a rim-driven electric motor. In particular for the embodiment depicted, the electric motor 138 includes a stator 140 integrated into the shroud assembly 128 and a rotor 142 integrated with the plurality of rotor blades 134 of the rotor blade assembly 126. More specifically, still, for the embodiment depicted the rotor 142 is integrated at a tip of each of the plurality of rotor blades 134 of the rotor blade assembly 126.

The stator 140 of the electric motor 138 is in electric communication with an electric input line 144, which may provide electrical power to the electric motor 138. The electric input line 144 may be in electrical communication with a power source, such as the power source 46 described above with reference to FIGS. 1 and 2.

In such a manner, the electric motor 138 may drive the rotor 142 and rotor blade assembly 126 about the rotational axis 136 of the first vertical thrust electric fan 114A, rotating the plurality of rotor blades 134 about the rotational axis 136 of the first vertical thrust electric fan 114A to drive an airflow 145 therethrough and generate vertical thrust/lift for the aircraft 100.

Figure 5:
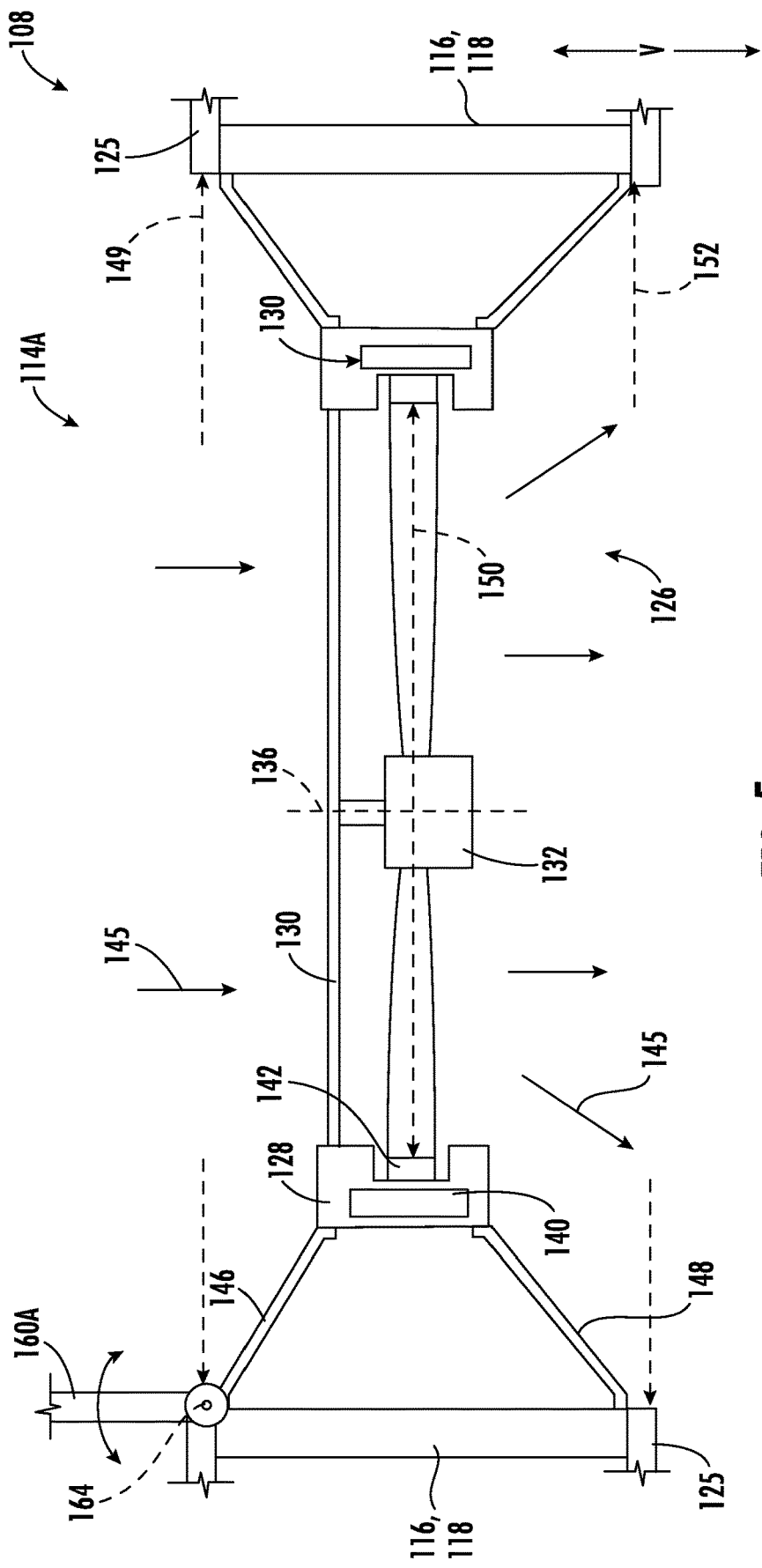
FIG. 5 is a schematic, cross-sectional view of the first vertical thrust electric fan of FIG. 3, as viewed along Line of 5-5 in FIG. 3.

Referring now also to FIG. 5, another schematic, cross-sectional view of the first vertical thrust electric fan 114A of FIG. 3 is provided, as viewed along Line of 5-5 in FIG. 3. As will be appreciated from the view of FIGS. 4 and 5, the first vertical thrust electric fan 114A is generally configured as a ducted fan (and more specifically, each of the plurality of vertical thrust electric fans 114 of the propulsion system 110 depicted in FIG. 3 are ducted fans).

Referring particularly to FIG. 5, it will be appreciated that the gap 120 within which the first vertical thrust electric fan 114A is positioned has a non-circular cross-sectional shape. As such, in the embodiment shown the shroud assembly 128 is spaced from the longitudinal support members 118 and/or transverse support members 116 in the view depicted. The first vertical thrust electric fan 114A accordingly includes an inlet duct 146 extending between the shroud assembly 128 and the adjacent support members (adjacent longitudinal support members 118 and/or adjacent transverse support members 116) upstream of the rotor blade assembly 126, and further includes an exhaust duct 148 extending between the shroud assembly 128 and the adjacent support members downstream of the rotor blade assembly 126. The inlet duct 146, the shroud assembly 128, and the exhaust duct 148 together form a duct for the first vertical thrust electric fan 114A. The inlet duct 146, the wing 108, or both define an inlet 149 to the first vertical thrust electric fan 114A.

Given the noncircular shape of the gap 120 within which the first vertical thrust electric fan 114A is positioned, the duct for the first vertical thrust electric fan 114A may facilitate a diffusion of the airflow 145 provided through the first vertical thrust electric fan 114A. More specifically, in the embodiment depicted, the shroud assembly 128 defines a rotor blade assembly opening 150 having a rotor blade assembly opening area. The first vertical thrust electric fan 114A, the wing 108, or both defines a first exhaust (or first exhaust opening) 152 downstream of the rotor blade assembly 126 having a first exhaust area. The first exhaust area is greater than the rotor blade assembly opening area. A ratio of the first exhaust area to rotor blade assembly opening area is, for the embodiment depicted, greater than one and less than or equal to two. For example, the ratio may be greater than or equal to 1.1, greater than or equal to 1.25, greater than or equal to 1.3.

In such a manner, the airflow 145 through the first vertical thrust electric fan 114A may be diffused as it exits through the exhaust duct 148, such that a speed of the airflow 145 exiting through the exhaust duct 148 is reduced. Such may provide, e.g., safety benefits for the aircraft 100.

As will be appreciated, for the embodiment shown, the ratio of the first exhaust area to rotor blade assembly opening area being greater than one may be due at least in part to the first exhaust 152 having a noncircular shape. For example, referring briefly back to FIG. 3, it will be appreciated that in the embodiment shown, the gaps 120 defined between the plurality of longitudinal support members 118 and the plurality of transverse support members 116 generally have a polygonal shape in the reference plane depicted, and more specifically, take the shape of a parallelogram.

It will be appreciated, however, that in other exemplary embodiments, the support structure 112 of the wing 108 may have any other suitable configuration, and the propulsion system 110 may similarly have any other suitable configuration for integration into the support structure 112.

Figure 6:
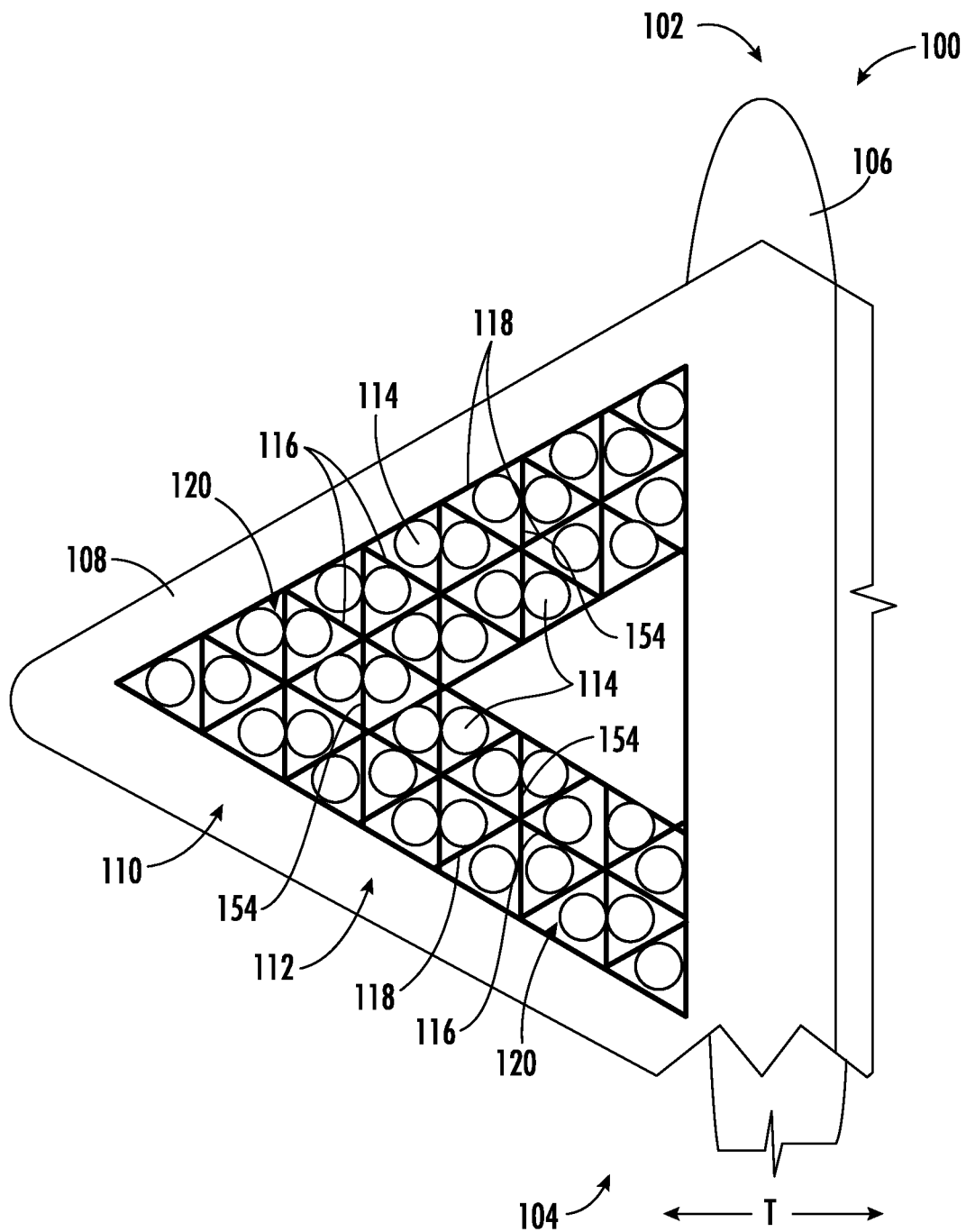
FIG. 6 is a close up, schematic view of a wing of an aircraft in accordance with another exemplary embodiment of the present disclosure.

For example, referring briefly to FIG. 6, a close-up, schematic view is provided of an aircraft 100 in accordance with another exemplary embodiment of the present disclosure. More specifically, FIG. 6 provides a schematic view of a wing 108 of an aircraft 100 having a support structure 112 and propulsion system 110 in accordance with another exemplary embodiment of the present disclosure.

In particular, for the embodiment shown, the support structure 112 includes a plurality of first structural members and a plurality of second structural members. Further, for the embodiment shown, the support structure 112 further includes a plurality of third structural members. The plurality of first structural members is more specifically a plurality of longitudinal support members 118 extending at least partially along the longitudinal direction L, the plurality of second support members is a plurality of transverse support members 116 extending at least partially along the transverse direction T, and the plurality of third support members is a plurality of crosswise support members 154. The plurality of longitudinal support members 118 extend at least partially between the plurality of transverse support members 116, and the plurality of crosswise support members 154 extend at least partially between both the plurality of longitudinal support members 118 and the plurality of transverse support members 116.

At least two of (and in the embodiment depicted, each of): the plurality of longitudinal support members 118; the plurality of transverse support members 116; and the plurality of crosswise support members 154 together define a plurality of gaps 120. The propulsion system 110 of the exemplary aircraft 100 of FIG. 6 includes a plurality of vertical thrust electric fans 114. Each vertical thrust electric fan 114 of the plurality of vertical thrust electric fans 114 is arranged between two or more of the plurality of longitudinal support members 118, the plurality of transverse support members 116, and the plurality of crosswise support members 154. More specifically, for the embodiment of FIG. 6, each of the plurality of vertical thrust electric fans 114 is positioned within a respective gap 120 of the plurality of gaps 120 defined by a longitudinal support member 118, a transverse support member 116, and a crosswise support member 154.

As with the embodiment described above, it will be appreciated that each gap 120 having a respective one of the plurality of vertical thrust electric fans 114 positioned therein has a non-circular cross-sectional shape. Although not depicted, an exhaust 152 (see, e.g., FIG. 5) of each of the plurality of vertical thrust electric fans 114 may similarly have a noncircular cross-sectional shape. In particular, for the embodiment of FIG. 6, each gap 120 (and each corresponding exhaust 152) defines a triangular shape.

Notably, the example configuration of FIG. 6 may generally facilitate a higher number of vertical thrust electric fans 114 integrated within the wing 108, and a tighter configuration of the support structure 112.

Further, still other configurations may have any other suitable design. For example, referring now briefly to FIG. 7, a close-up, schematic view is depicted of an aircraft 100 in accordance with another exemplary embodiment of the present disclosure. More specifically, FIG. 7 provides a schematic view of a wing 108 of an aircraft 100 having a support structure 112 and propulsion system 110 in accordance with yet another exemplary embodiment of the present disclosure.

Figure 7:
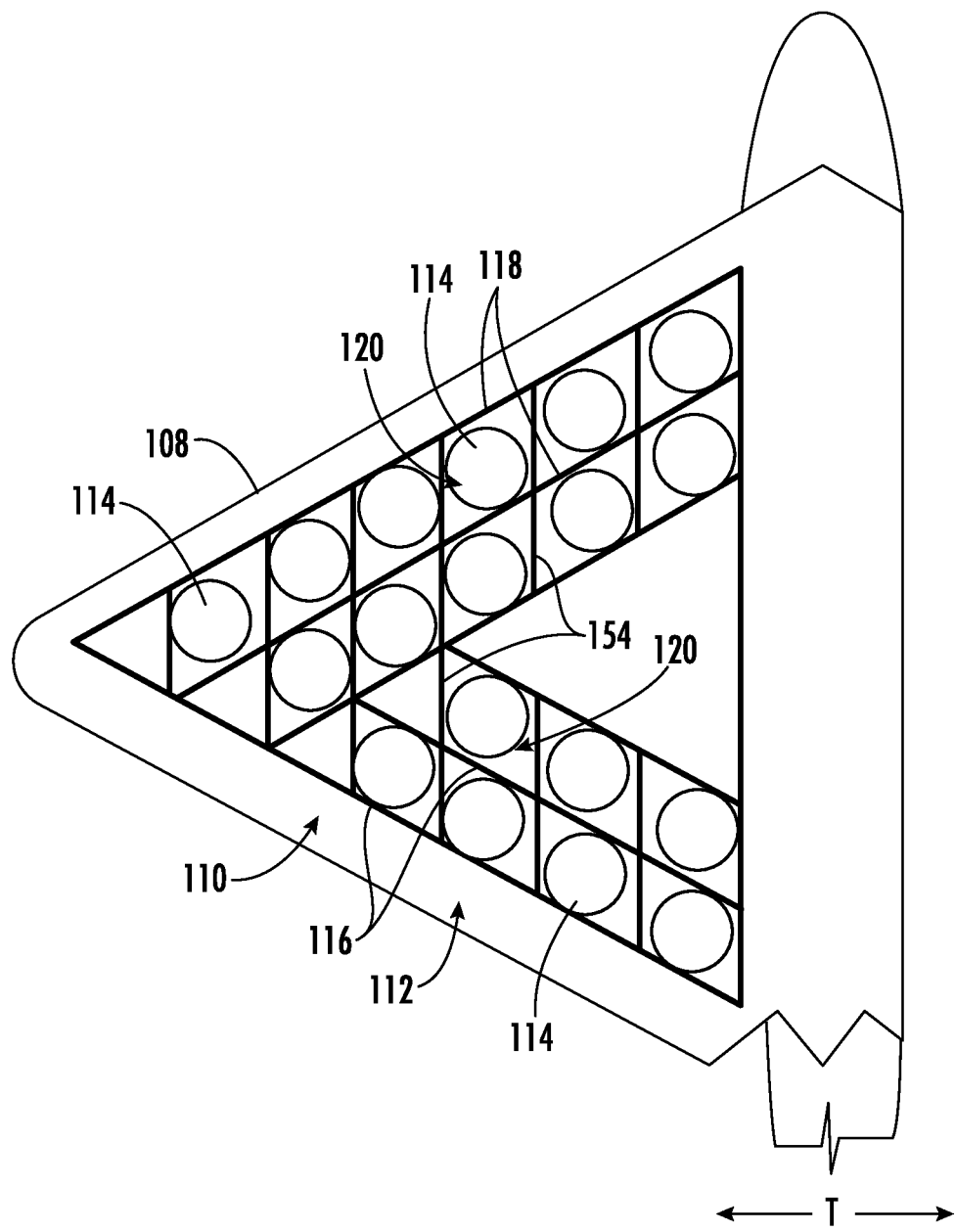
FIG. 7 is a close up, schematic view of a wing of an aircraft in accordance with yet another exemplary embodiment of the present disclosure.

The exemplary embodiment of FIG. 7 may be configured in substantially the same manner as exemplary embodiment of FIG. 6. However, for the exemplary embodiment of FIG.

7, the plurality of longitudinal support members 118 are not arranged along the entirety of the wing 108 along the longitudinal direction L, and similarly, the plurality of transverse support members 116 are not arranged along the entirety of the wing 108 along the longitudinal direction L. In such a manner, the support structure 112 depicted defines a plurality of gaps 120, with certain of the plurality of gaps 120 defined between one or more of the plurality of longitudinal support members 118 and one or more of a plurality of crosswise support members 154, and others of the plurality of gaps 120 defined between one or more of the plurality of transverse support members 116 and one or more of the plurality of crosswise support members 154.

As will be appreciated, the exemplary propulsion systems 110 depicted in the exemplary embodiments above may be utilized to provide a vertical thrust for an aircraft 100 to facilitate vertical takeoff and vertical landing operations. The aircraft 100 may further be configured to generate forward thrust during other operations of a particular flight envelope. During forward thrust operations, it may be beneficial to cover an inlet 149 (see FIG. 5) of each vertical thrust electric as well as an exhaust 152 (see FIG. 5) of each vertical thrust electric fan 114.

Figure 8:
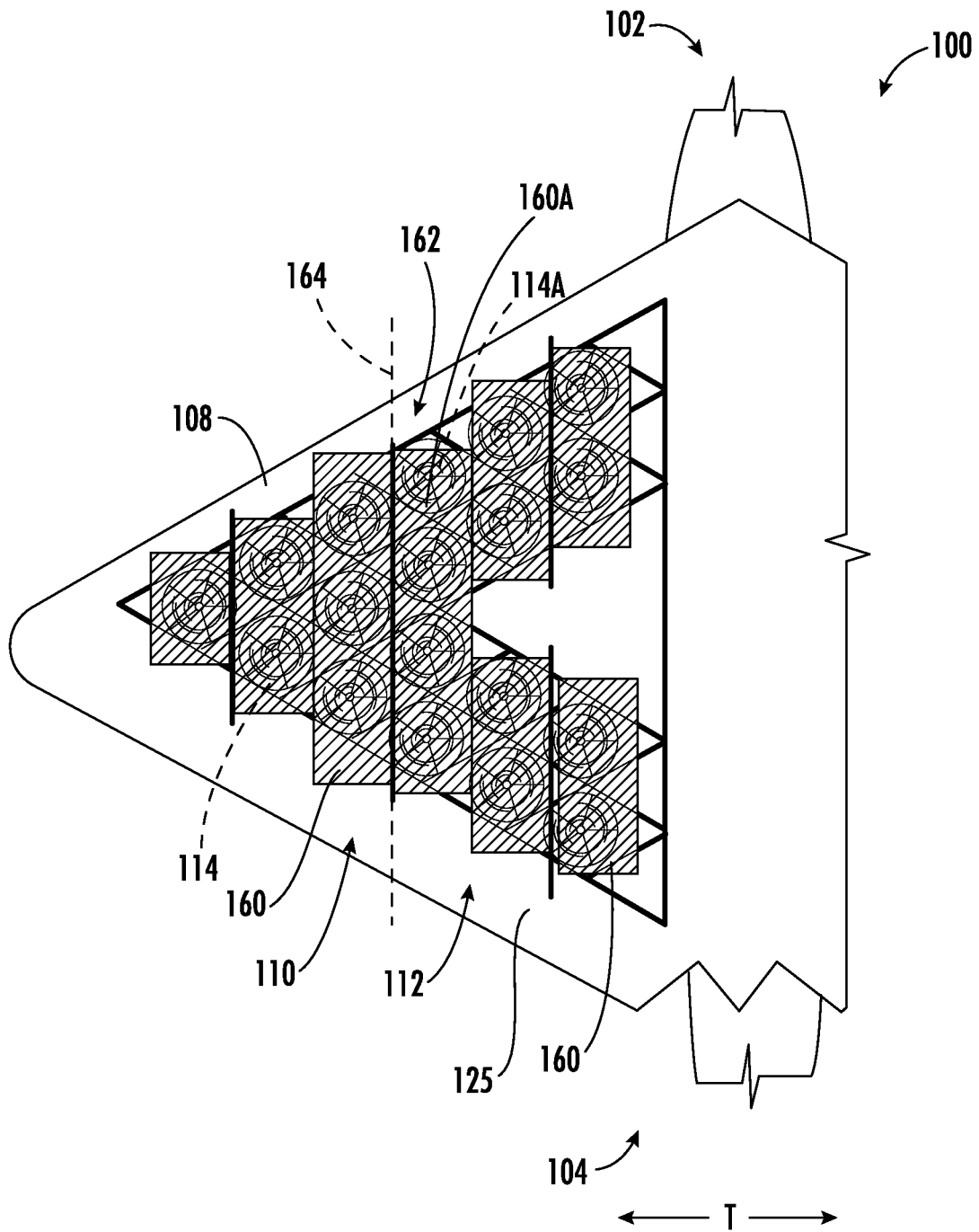
FIG. 8 is a close up, schematic view of a wing of an aircraft in accordance with still another exemplary embodiment of the present disclosure.

Referring now to FIG. 8, another view of the exemplary wing 108 of FIG. 3 is provided. In the view depicted in FIG. 8, the wing 108 further includes a door 160 on a top side 162 of the wing 108 movable between an open position and a closed position (shown). The closed position is depicted, and at least a portion of the open position may be seen in the view of FIG. 5.

Although not depicted, it will be appreciated that the wing 108 may first include a plurality of doors on a bottom side of the wing 108 configured in a similar manner as the doors 160 on the top side 162 discussed herein.

More specifically, the door 160 is a first door 160A of a plurality of doors 160 configured to cover a plurality of inlets 149 of the respective vertical thrust electric fans 114 depicted. The first door 160A in the embodiment shown covers two or more of the vertical thrust electric fans 114 of the plurality of vertical thrust electric fans 114. More specifically, still, the first door 160A in the embodiment shown covers three or more of the vertical thrust electric fans 114, and less than all of the vertical thrust electric fans 114.

Notably, each door 160 of the plurality of doors 160 is movable between an open position and a closed position (depicted) about a respective hinge axis 164 (see also FIG. 5). The hinge axis 164 is aligned with the longitudinal direction L of the aircraft 100. In such a manner, each door 160 of the plurality of doors 160 may be configured to minimize a wind resistance when the aircraft 100 transitions from a vertical flight operation to a forward flight operation.

Although not depicted, it will be appreciated that the propulsion system 110 may include one or more actuators mechanically coupled to one or more of the plurality of doors 160 for moving one or more of the plurality of doors 160 between the open position and the closed position. The one or more actuators may be, e.g., pneumatic actuators, hydraulic actuators, electric actuators etc. Each door 160 may include one or more dedicated actuators. Alternatively, two or more doors 160 of the plurality of doors 160 may be moved between the open position and the closed position using a common actuator or set of actuators.

As will be appreciated from the view of FIG. 8, when the doors 160 are moved to the closed position, the doors 160 may be flush with an outer surface layer 125 of the wing 108 so as to form a continuous aerodynamic surface with minimal or no aerodynamic impact during forward flight operations.

It will be appreciated, however, that in other exemplary embodiments, the aircraft 100 may be configured in any other suitable manner.

Figure 9:
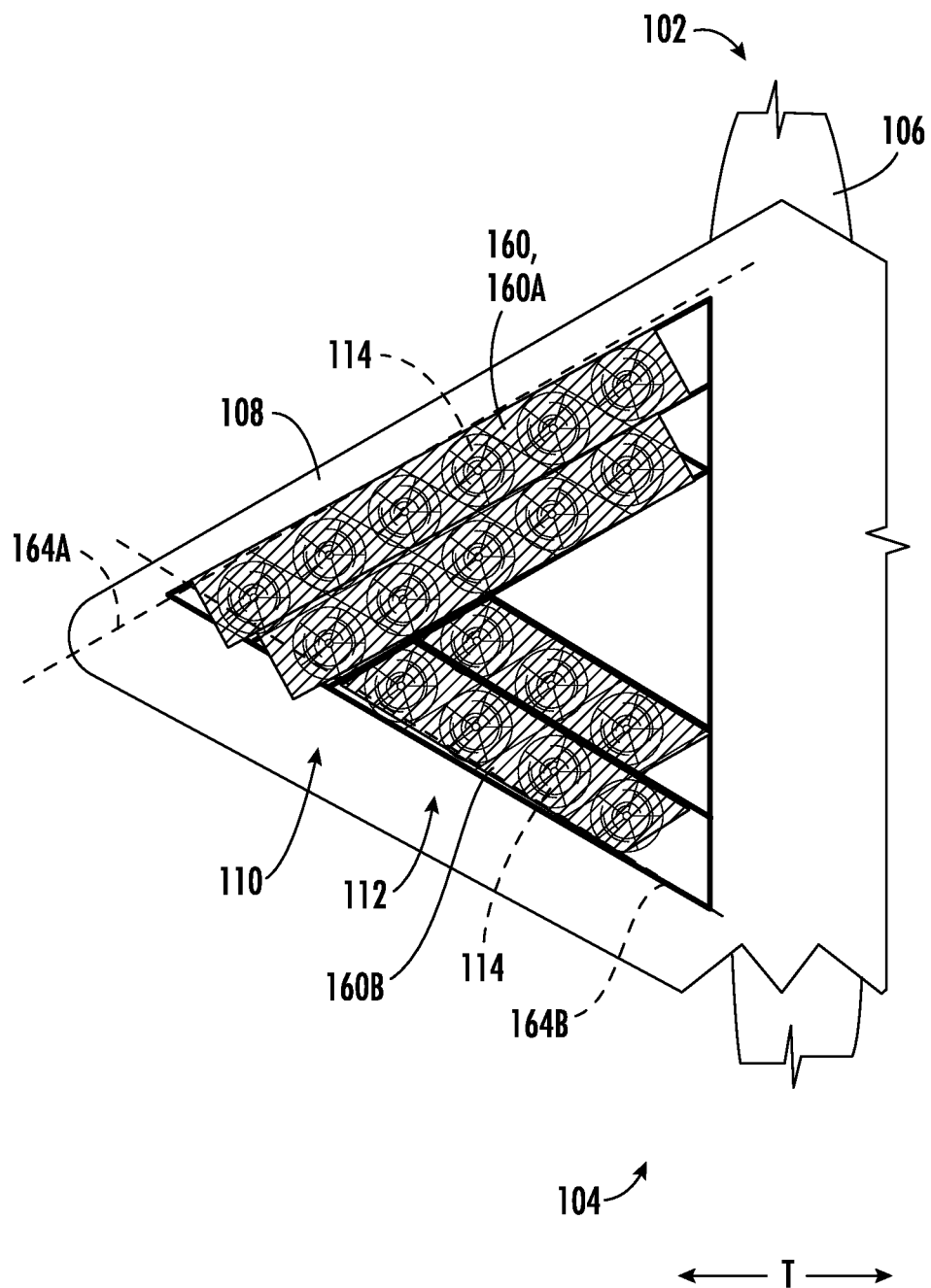
FIG. 9 is a close up, schematic view of a wing of an aircraft in accordance with yet another exemplary embodiment of the present disclosure.

For example, referring now to FIG. 9, a top, schematic view of a wing 108 of an aircraft 100 in accordance with another exemplary embodiment of the present disclosure is provided. The exemplary aircraft 100 of FIG. 9 may be configured in a similar manner as one or more of the exemplary aircraft 100 described above, such as the exemplary aircraft 10 of FIG. 7. For example, the exemplary aircraft 100 generally includes a propulsion system 110 having a plurality of vertical thrust electric fans 114 and a plurality of doors 160 movable between an open position and a closed position. The doors 160 may be configured in a similar manner as exemplary doors 160 described above with reference to, e.g., FIG. 8. However, the exemplary doors 160 of FIG. 9 each defines a hinge axis 164 oblique to a longitudinal direction L of the aircraft 100. For example, a first door 160A of the plurality of doors 160 defines a first hinge axis 164A oblique to the longitudinal direction L.

In addition, at least one hinge axis 164 of the plurality of the hinge axes 164 is oblique to the first hinge axis 164A. For example, the hinge axis 164A of the first door 160A is oblique to a second hinge axis 164B of a second door 160B of the plurality of doors 160. In such manner, it will be appreciated that not all of the hinge axes 164 of the respective doors 160 of the plurality of doors 160 are parallel with one another.

Figure 10:
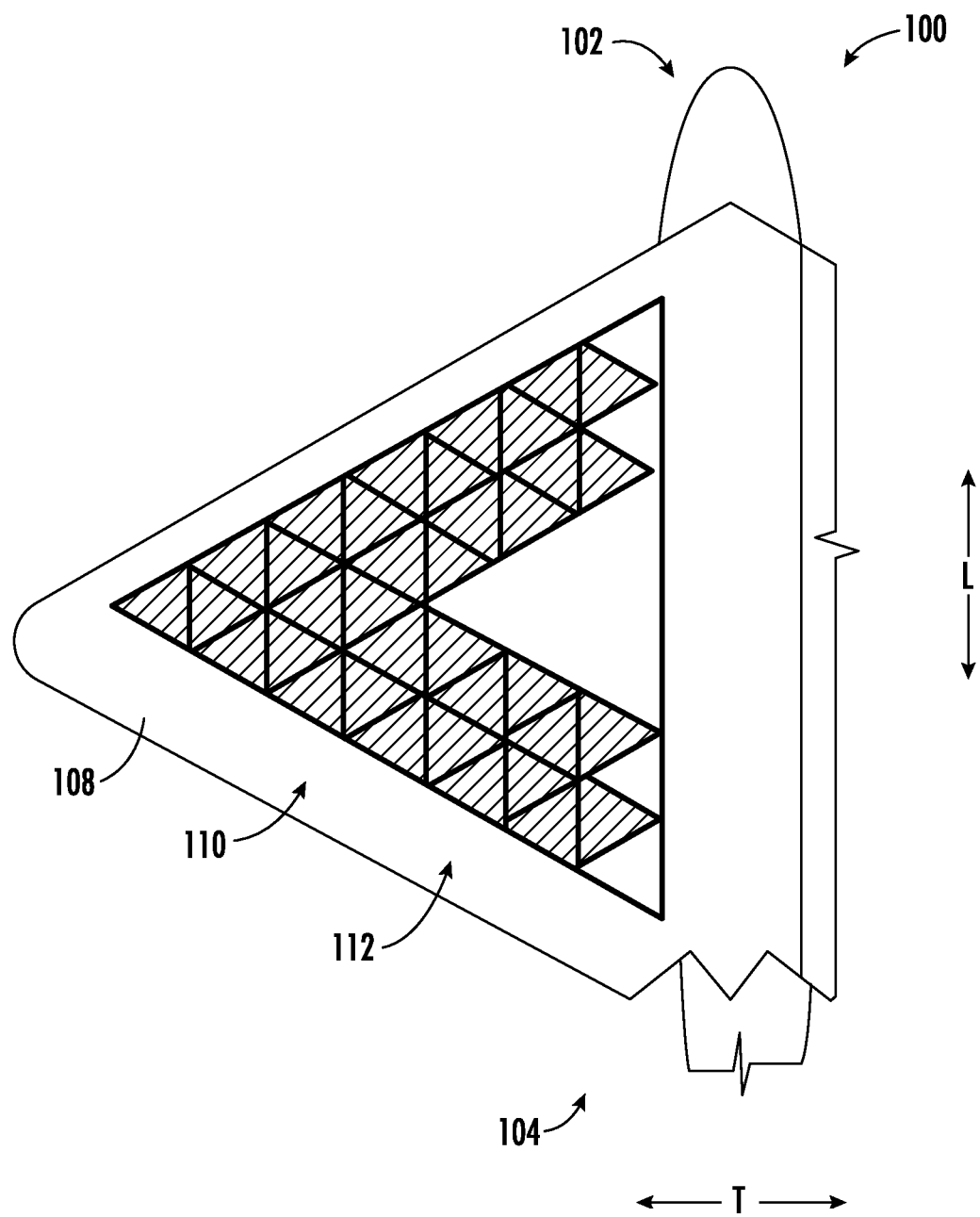
FIG. 10 is a close up, schematic view of a wing of an aircraft in accordance with yet another exemplary embodiment of the present disclosure.

Further, for example, referring now to FIG. 10, a top, schematic view of a wing 108 of an aircraft 100 in accordance with yet another example embodiment of the present disclosure is provided. The exemplary aircraft 100 of FIG. 10 may be configured in a similar manner as one or more of the exemplary aircraft 100 described above, such as the exemplary embodiment of FIG. 6. For example, the exemplary aircraft 100 generally includes a propulsion system 110 having a plurality of vertical thrust electric fans 114 (see FIG. 6) and a plurality of doors 160 movable between an open position and a closed position (shown). The doors 160 may be configured in a similar manner as exemplary doors 160 described above with reference to, e.g., FIG. 8. However, for the embodiment of FIG. 10 each door 160 of the plurality of doors 160 is a dedicated door 160 to a single one of the plurality of vertical thrust electric fans 114. With such configuration, the propulsion system 110 may provide a more granular vertical thrust profile for the aircraft 100. Notably, the door arrangement of FIG. 10 may be associated with the vertical thrust electric fan 114 configuration described above with reference to FIG. 6.

Further aspects are provided by the subject matter of the following clauses:

An aircraft defining a vertical direction, a longitudinal direction, and a transverse direction, the aircraft comprising: a fuselage; a propulsion system comprising a power source and a plurality of vertical thrust electric fans driven by the power source; and a wing extending from the fuselage in the transverse direction, the wing comprising a support structure, the support structure comprising a plurality of first support members and a plurality of second support members, the plurality of first support members extending at least partially between the plurality of second support members, the plurality of vertical thrust electric fans arranged between the plurality of first support members and the plurality of second support members.

The aircraft of any preceding clause, wherein the plurality of first support members is a plurality of transverse support members extending at least partially along the transverse direction, and wherein the plurality of second support members is a plurality of longitudinal support members extending at least partially along the longitudinal direction.

The aircraft of any preceding clause, wherein the plurality of second support members and the plurality of first support members together define a plurality of gaps, and wherein each vertical thrust electric fan of the plurality of vertical thrust electric fans is positioned in a respective gap of the plurality of gaps.

The aircraft of any preceding clause, wherein the plurality of vertical thrust electric fans includes two or more vertical thrust electric fans arranged along the longitudinal direction.

The aircraft of any preceding clause, wherein each vertical thrust electric fan of the plurality of vertical thrust electric fans includes a rim-driven motor.

The aircraft of any preceding clause, wherein the wing comprises a leading edge and a trailing edge, wherein the plurality of second support members includes a leading edge second support member extending parallel to the leading edge of the wing, and wherein the plurality of first support members includes a trailing edge first support member extending parallel to the trailing edge of the wing.

The aircraft of any preceding clause, wherein the plurality of second support members, the plurality of first support members, or both include a plurality of straight support members.

The aircraft of any preceding clause, wherein the plurality of vertical thrust electric fans are each ducted fans.

The aircraft of any preceding clause, wherein a first vertical thrust electric fan of the plurality of vertical thrust electric fans includes a rotor blade assembly and a shroud assembly surrounding the rotor blade assembly, wherein the shroud assembly defines a rotor blade assembly opening having a rotor blade assembly opening area, wherein the first vertical thrust electric fan, the wing, or both defines a first exhaust downstream of the rotor blade assembly having a first exhaust area, and wherein the first exhaust area is greater than the rotor blade assembly opening area.

The aircraft of any preceding clause, wherein a ratio of the first exhaust area to the rotor blade assembly opening area is greater than 1 and less than or equal to 2.

The aircraft of any preceding clause, wherein a first vertical thrust electric fan of the plurality of vertical thrust electric fans includes a rotor blade assembly and a shroud assembly surrounding the rotor blade assembly, wherein the first vertical thrust electric fan, the wing, or both defines a first exhaust downstream of the rotor blade assembly having a non-circular shape.

The aircraft of any preceding clause, wherein the wing further comprises a door on a top side of the wing moveable between an open position and a closed position, wherein the door covers two or more vertical thrust electric fans of the plurality of vertical thrust electric fans.

The aircraft of any preceding clause, wherein the wing further comprises a door on a top side of the wing moveable between an open position and a closed position about a hinge axis, wherein the hinge axis is aligned with the longitudinal direction of the aircraft.

A wing assembly for an aircraft, the aircraft defining a vertical direction, a longitudinal direction, and a transverse direction, the wing assembly comprising: a propulsion system comprising a plurality of vertical thrust electric fans; and a wing comprising a support structure, the support structure comprising a plurality of first support members and a plurality of second support members, the plurality of first support members extending at least partially between the plurality of second support members, the plurality of vertical thrust electric fans arranged between the plurality of first support members and the plurality of second support members.

The wing assembly of any preceding clause, wherein the plurality of first support members is a plurality of transverse support members configured to extend at least partially along the transverse direction, and wherein the plurality of second support members is a plurality of longitudinal support members configured to extend at least partially along the longitudinal direction.

The wing assembly of any preceding clause, wherein the plurality of second support members and the plurality of first support members together define a plurality of gaps, and wherein each vertical thrust electric fan of the plurality of vertical thrust electric fans is positioned in a respective gap of the plurality of gaps.

The wing assembly of any preceding clause, wherein each vertical thrust electric fan of the plurality of vertical thrust electric fans includes a rim-driven motor.

The wing assembly of any preceding clause, wherein the wing comprises a leading edge and a trailing edge, wherein the plurality of second support members includes a leading edge second support member extending parallel to the leading edge of the wing, and wherein the plurality of first support members includes a trailing edge first support member extending parallel to the trailing edge of the wing.

The wing assembly of any preceding clause, wherein the plurality of second support members, the plurality of first support members, or both include a plurality of straight support members.

The wing assembly of any preceding clause, wherein a first vertical thrust electric fan of the plurality of vertical thrust electric fans includes a rotor blade assembly and a shroud assembly surrounding the rotor blade assembly, wherein the shroud assembly defines a rotor blade assembly opening having a rotor blade assembly opening area, wherein the first vertical thrust electric fan, the wing, or both defines a first exhaust downstream of the rotor blade assembly having a first exhaust area, and wherein the first exhaust area is greater than the rotor blade assembly opening area.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. An aircraft defining a vertical direction, a longitudinal direction, and a transverse direction, the aircraft comprising:
   a fuselage;
   a propulsion system comprising a power source and a plurality of vertical thrust electric fans driven by the power source; and
   a wing extending from the fuselage in the transverse direction, the wing comprising a leading edge, a trailing edge, and a support structure, the support structure comprising a plurality of first support members and a plurality of second support members, the plurality of first support members extending at least partially between the plurality of second support members, wherein the plurality of second support members includes a leading edge second support member extending parallel to the leading edge of the wing, wherein the plurality of first support members includes a trailing edge first support member extending parallel to the trailing edge of the wing, wherein the plurality of vertical thrust electric fans is arranged between the plurality of first support members and the plurality of second support members, wherein a first group of vertical thrust electric fans of the plurality of vertical thrust electric fans is arranged along the trailing edge first support member, and wherein a second group of vertical thrust electric fans of the plurality of vertical thrust electric fans is arranged along the leading edge second support member.

2. The aircraft of claim 1, wherein the plurality of first support members is a plurality of transverse support members extending at least partially along the transverse direction, and wherein the plurality of second support members is a plurality of longitudinal support members extending at least partially along the longitudinal direction.

3. The aircraft of claim 1, wherein the plurality of second support members and the plurality of first support members together define a plurality of gaps, and wherein each vertical thrust electric fan of the plurality of vertical thrust electric fans is positioned in a respective gap of the plurality of gaps.

4. The aircraft of claim 1, wherein the plurality of vertical thrust electric fans includes two or more vertical thrust electric fans arranged along the longitudinal direction.

5. The aircraft of claim 1, wherein each vertical thrust electric fan of the plurality of vertical thrust electric fans includes a rim-driven motor.

6. The aircraft of claim 1, wherein the plurality of second support members, the plurality of first support members, or both include a plurality of straight support members.

7. The aircraft of claim 1, wherein the plurality of vertical thrust electric fans are each ducted fans.

8. The aircraft of claim 1, wherein a first vertical thrust electric fan of the plurality of vertical thrust electric fans includes a rotor blade assembly and a shroud assembly surrounding the rotor blade assembly, wherein the shroud assembly defines a rotor blade assembly opening having a rotor blade assembly opening area, wherein the first vertical thrust electric fan, the wing, or both defines a first exhaust downstream of the rotor blade assembly having a first exhaust area, and wherein the first exhaust area is greater than the rotor blade assembly opening area.

9. The aircraft of claim 8, wherein a ratio of the first exhaust area to the rotor blade assembly opening area is greater than 1 and less than or equal to 2.

10. The aircraft of claim 1, wherein a first vertical thrust electric fan of the plurality of vertical thrust electric fans includes a rotor blade assembly and a shroud assembly surrounding the rotor blade assembly, wherein the first vertical thrust electric fan, the wing, or both defines a first exhaust downstream of the rotor blade assembly having a non-circular shape.

11. The aircraft of claim 1, wherein the wing further comprises a door on a top side of the wing moveable between an open position and a closed position, wherein the door covers two or more vertical thrust electric fans of the plurality of vertical thrust electric fans.

12. The aircraft of claim 1, wherein the wing further comprises a door on a top side of the wing moveable between an open position and a closed position about a hinge axis, wherein the hinge axis is aligned with the longitudinal direction of the aircraft.

13. A wing assembly for an aircraft, the aircraft defining a vertical direction, a longitudinal direction, and a transverse direction, the wing assembly comprising:
a propulsion system comprising a plurality of vertical thrust electric fans; and
a wing comprising a leading edge, a trailing edge, and a support structure, the support structure comprising a plurality of first support members and a plurality of second support members, the plurality of first support members extending at least partially between the plurality of second support members, wherein the plurality of second support members includes a leading edge second support member extending parallel to the leading edge of the wing, wherein the plurality of first support members includes a trailing edge first support member extending parallel to the trailing edge of the wing, wherein the plurality of vertical thrust electric fans is arranged between the plurality of first support members and the plurality of second support members, wherein a first group of vertical thrust electric fans of the plurality of vertical thrust electric fans is arranged along the trailing edge first support member, and wherein a second group of vertical thrust electric fans of the plurality of vertical thrust electric fans is arranged along the leading edge second support member.

14. The wing assembly of claim 13, wherein the plurality of first support members is a plurality of transverse support members configured to extend at least partially along the transverse direction, and wherein the plurality of second support members is a plurality of longitudinal support members configured to extend at least partially along the longitudinal direction.

15. The wing assembly of claim 13, wherein the plurality of second support members and the plurality of first support members together define a plurality of gaps, and wherein each vertical thrust electric fan of the plurality of vertical thrust electric fans is positioned in a respective gap of the plurality of gaps.

16. The wing assembly of claim 13, wherein each vertical thrust electric fan of the plurality of vertical thrust electric fans includes a rim-driven motor.

17. The wing assembly of claim 13, wherein the plurality of second support members, the plurality of first support members, or both include a plurality of straight support members.

18. The wing assembly of claim 13, wherein a first vertical thrust electric fan of the plurality of vertical thrust electric fans includes a rotor blade assembly and a shroud assembly surrounding the rotor blade assembly, wherein the shroud assembly defines a rotor blade assembly opening having a rotor blade assembly opening area, wherein the first vertical thrust electric fan, the wing, or both defines a first exhaust downstream of the rotor blade assembly having a first exhaust area, and wherein the first exhaust area is greater than the rotor blade assembly opening area.

* * * * *